United States Patent
Huntly-Playle et al.

(10) Patent No.: US 7,475,322 B2
(45) Date of Patent: Jan. 6, 2009

(54) WIRELESS BROADCAST PROTOCOL

(75) Inventors: Iain Huntly-Playle, La Jolla, CA (US);
C. David Covington, Fayetteville, AK (US); Charles Lally, Vista, CA (US); Sheng Li, San Diego, CA (US); Richard L. Moore, Escondido, CA (US)

(73) Assignee: Avocent Huntsville Corporation, Huntsville, AL (US)

( * ) Notice: Subject to any disclaimer, the term of this patent is extended or adjusted under 35 U.S.C. 154(b) by 709 days.

(21) Appl. No.: 10/947,164

(22) Filed: Sep. 23, 2004

(65) Prior Publication Data

US 2005/0108614 A1    May 19, 2005

Related U.S. Application Data

(60) Provisional application No. 60/519,610, filed on Nov. 14, 2003.

(51) Int. Cl.
G08C 25/02 (2006.01)
H04L 1/18 (2006.01)
H04L 1/14 (2006.01)
H03M 13/00 (2006.01)

(52) U.S. Cl. ........................ 714/748; 714/749; 714/750; 714/751

(58) Field of Classification Search .......... 714/748–751
See application file for complete search history.

(56) References Cited

U.S. PATENT DOCUMENTS

| | | | |
|---|---|---|---|
| 4,597,073 A * | 6/1986 | Staples | 370/276 |
| 5,295,235 A | 3/1994 | Newman | |
| 5,721,842 A | 2/1998 | Beasley et al. | |
| 5,732,212 A | 3/1998 | Perholtz et al. | |
| 5,751,004 A | 5/1998 | Robinson et al. | |
| 6,404,927 B1 | 6/2002 | Li et al. | |
| 6,418,494 B1 | 7/2002 | Shatas et al. | |
| 6,486,909 B1 | 11/2002 | Pirim | |
| 6,681,250 B1 | 1/2004 | Thomas et al. | |
| 6,789,123 B2 * | 9/2004 | Li et al. | 709/231 |
| 6,880,002 B2 | 4/2005 | Hirschfeld et al. | |
| 6,915,362 B2 | 7/2005 | Ramsey et al. | |
| 6,956,855 B1 * | 10/2005 | Chang | 370/394 |
| 7,180,896 B1 * | 2/2007 | Okumura | 370/394 |
| 7,209,958 B2 | 4/2007 | Crookham et al. | |

OTHER PUBLICATIONS

Search Report and Written Opinion mailed Jun. 24, 2008 in PCT Appln. No. PCT/US2004/038171.

* cited by examiner

Primary Examiner—Joseph D Torres
(74) Attorney, Agent, or Firm—Davidson Berquist Jackson & Gowdey, LLP

(57) ABSTRACT

In a keyboard-video-mouse ("KVM") system in which a target computer may be wirelessly accessed by a plurality of remote stations, a method includes, by the target computer: obtaining a frame of video data; transmitting packets for the frame; transmitting a query packet; obtaining a list of requests from at least one of the remote stations, each request from a particular remote station identifying packets missed by that particular remote station; and resending at least some of the requested packets.

6 Claims, 4 Drawing Sheets

WIRELESS BROADCAST PROTOCOL

RELATED APPLICATIONS

This application claims priority to provisional U.S. Patent Application No. 60/519,610, filed Nov. 14, 2003, which is incorporated by reference herein.

FIELD OF THE INVENTION

This invention relates to the field of computer data processing, and, more specifically, to data processing using wireless-based keyboard-video-mouse ("KVM") systems.

BACKGROUND

Systems exist to facilitate remote control of and access to a computer by an operator at a remote station. Such systems typically use a device or mechanism that enables an operator at a remote station to control aspects of a so-called target (or local) computer. More particularly, such systems typically allow a remote station to provide mouse and keyboard input to the target computer and further allow the remote station to view the video display output, and hear the audio output of the target computer. These types of systems are typically called keyboard-video-mouse (KVM) systems.

Traditional KVM systems rely on wired technology to connect remote and target computers. It is, however, sometimes desirable to allow wireless connection between remote stations and target computers (included as part of a target system). For example, in addition to minimizing the number of actual wires needed in a KVM system, a wireless KVM system allows for target systems and remote stations to be added to the system without the addition of switches or wires.

BRIEF DESCRIPTION OF THE DRAWINGS

For a more complete understanding of the present invention and the advantages thereof, reference should be made to the following Detailed Description taken in connection with the accompanying drawings, in which.

DETAILED DESCRIPTION OF PRESENTLY PREFERRED EXEMPLARY EMBODIMENTS OF THE INVENTION

Figure 1:
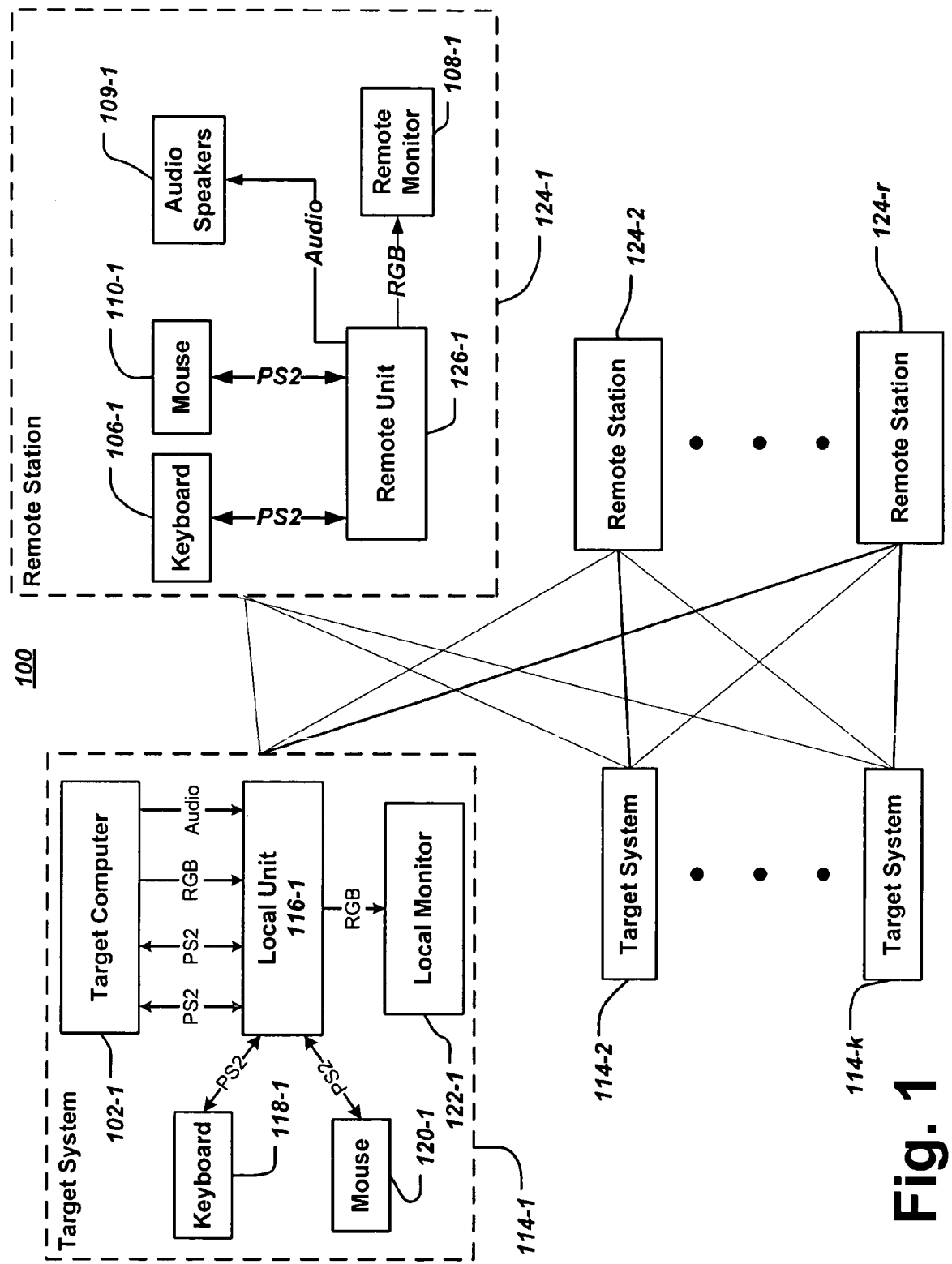
FIG. 1 shows a high-level view of a typical KVM system according to embodiments of the present invention.

A typical KVM system 100 according to embodiments of the present invention is shown in FIG. 1, where one or more target computers 102-1, 102-2, ..., 102-$k$ (generally 102), with attached local units 116, are controlled or accessed by one or more remote stations 124-1, 124-2, ..., 124-$r$ (generally 124). Each remote station 124 generally includes a remote unit, a keyboard, a video monitor, audio speakers and a mouse (or similar point-and-click device), although some remote stations may only include a video display and a remote unit. (For reference, the remote unit, audio speakers, keyboard, mouse and video monitor of the remote station 124-$x$ are referred to as remote unit 126-$x$, keyboard 106-$x$, monitor 108-$x$, audio speakers 109-$x$, and mouse 110-$x$ respectively.) Operation of a particular target computer 102-$i$ may be remotely viewed on the video monitor 108 of any of the remote stations 124, the audio heard on the speakers 109 of a remote station, and the keyboard 106 and mouse 110 of a remote station 124 may be used to provide keyboard and mouse input to the target computer 102-$i$. As shown in FIG. 1, in a typical KVM system 100 according to the present invention, a remote station 124 is able to control or access more than one target computer. Note that the lines drawn between target systems and remote stations in FIG. 1 represent potential (and not necessarily actual) wireless (RF) links between those sides. Thus, each target computer 102 may be controlled or accessed by more than one remote station 124, and each remote station 124 may control more than one target computer 102. The remote station, in a typical system, may be located within several hundred feet of the target system.

The present invention provides wireless KVM systems and mechanisms that support such systems. In the discussion that follows, the computer or system being controlled or accessed is generally referred to as the target computer or the target system. In some instances, the target computer is also referred to as the local computer. The system that is being used to access or control the target (local) computer is generally referred to herein as the remote system. For convenience of description, components on or connected directly to the target computer are referred to herein as "local", whereas components that are on or connected directly to the remote system are referred to herein as "remote." Additionally, as used herein, in certain contexts, the target system is considered to be a video transmitter or sending unit, and the remote system is the video receiving unit or receiver.

FIG. 1 shows in greater detail certain components of a KVM system according to embodiments of the present invention. The local or target system 114 includes a target computer 102 and an associated local unit 116. The local system 114 may also include a keyboard 118, a mouse (or other point-and-click-type device) 120 and a local monitor 122, each connected to the local unit 116 directly. The remote station 124 includes a remote unit 126. Additionally, the remote system 124 includes a keyboard 106, a mouse (or other point-and-click-type device) 110, a remote monitor 108 and a set of stereo audio speakers 109. The local or target computer 102 may be a computer, a server, a processor or other collection of processors or logic elements. Generally, as contemplated by the inventors, and as one skilled in the art would recognize, a target computer may be any processor or collection of processors. By way of example, a target computer may be a processor or collection of processors or logic elements located (or embedded) in a server, a desktop computer (such as a PC, Apple Macintosh or the like), a kiosk, an ATM, a switch, a set-top box, an appliance (such as a television, DVR, DVD player and the like), a vehicle, an elevator, on a manufacturing or processing production line. A collection of target computers may, e.g., be a collection of servers in a rack or some other collection, they may be independent of each other or connected to each other in a network or by some other structure. The local and remote monitors 122, 108, may be digital or analog.

The local unit 116 is a device or mechanism, e.g., a printed circuit board ("PCB"), that is installed locally to the target/local computer 102. This device may be close to, but external to the computer, or may be installed inside the computer's housing. Regardless of the positioning of the local unit 116, there will preferably be a direct electrical connection between the target computer 102 and the local unit 116.

Various components on the local/target system 114 communicate wirelessly with components on the remote station 124 via a wireless connection link 134. The wireless connection or link 134 preferably follows the IEEE 802.11a standard protocol, although one skilled in the art will realize that other protocols and methods of wireless communication are within the scope of the invention.

Details of one target system (114-1) and one remote station (124-1) are shown in FIG. 1. One skilled in the art will realize that the other target systems and remote stations have like or similar configurations as those shown for target system 114-1 and remote station 124-1, respectively. As shown in FIG. 1, the local unit 116-1 receives local mouse and keyboard signals, e.g., as PS2 signals. These signals are provided by the local unit 116-1 to the target computer 102-1. The target computer 102-1 generates video output signals, e.g., RGB (Red, Green, Blue) signals, which are provided to the local unit 116-1 which, in turn, provides the signals to drive the local monitor 122-1. The target computer 102-1 generates audio output signals which are provided to the local unit 116-1. As noted, the target computer 102-1 need not have a keyboard, mouse or monitor, and may be controlled entirely by a remote computer.

Local unit 116-1 transmits image and audio data for transmission to a remote station (e.g., remote unit 126-1). Some or all of the data may be compressed before being transmitted. Additionally, local unit 116-1 may receive mouse and keyboard data (from a remote station), which is then provided to the local/target computer 102-1. The target computer 102-1 may execute the data received and may display output on its local monitor 122-1.

The remote station 124 receives video data from the local unit 116 of the target computer 102, preferably wirelessly (e.g., via an 802.11a wireless connection 134). The remote unit 126 receives (possibly compressed) video and audio data (not all of the data need be compressed) from the local unit 116. The remote unit 126 decompresses (as necessary) the video and audio data from the local unit 116 and provides it to the remote monitor 108, which displays the video data, and the remote speakers, as appropriate. Additionally, remote mouse 110 and keyboard 106 may be used to generate appropriate signals (e.g., PS2 signals) that may be transmitted via remote unit 126 to local unit 116 for execution on target computer 102.

Figure 2:
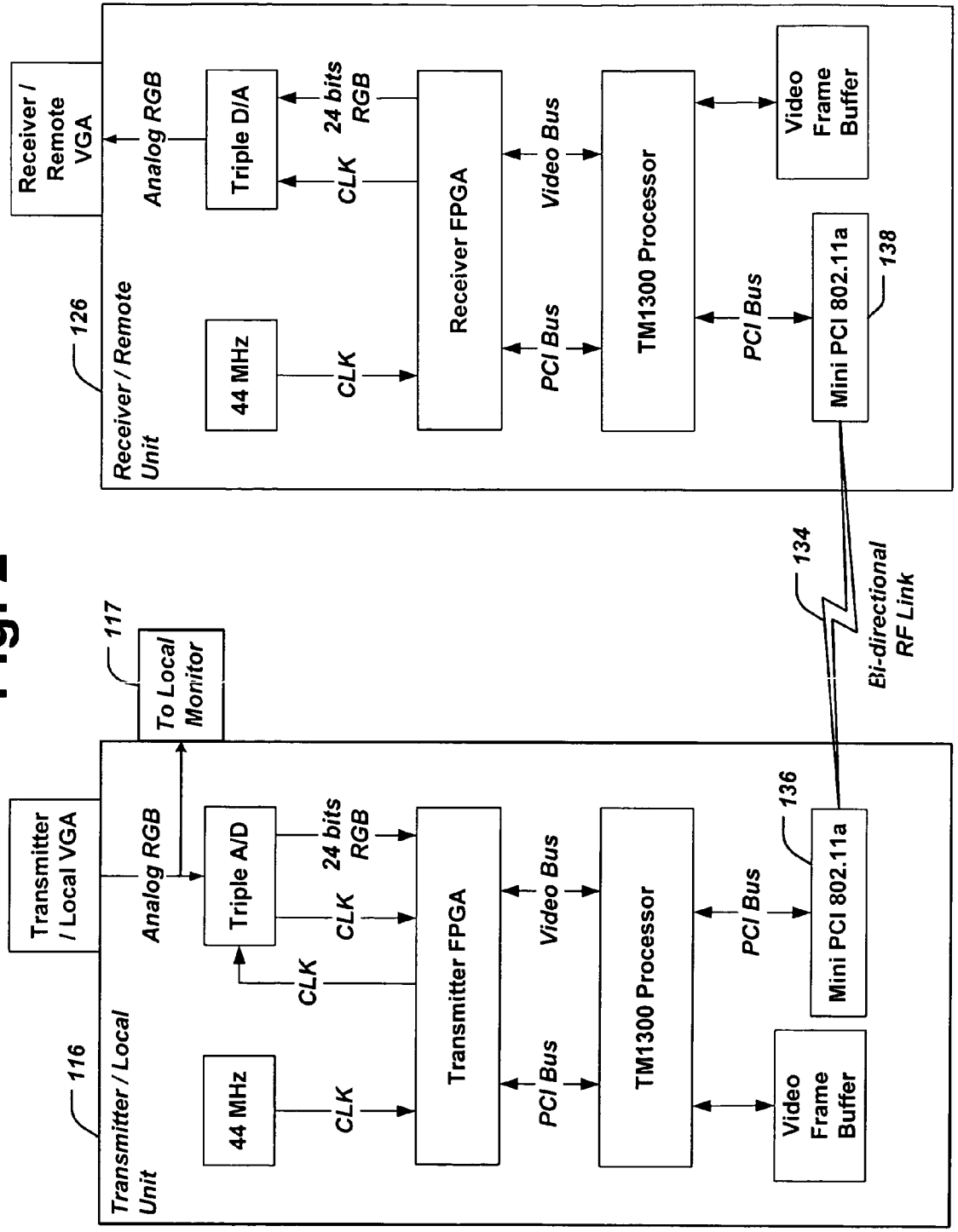
FIG. 2 depicts aspects of a video system according to embodiments of the present invention.
Figure 3:
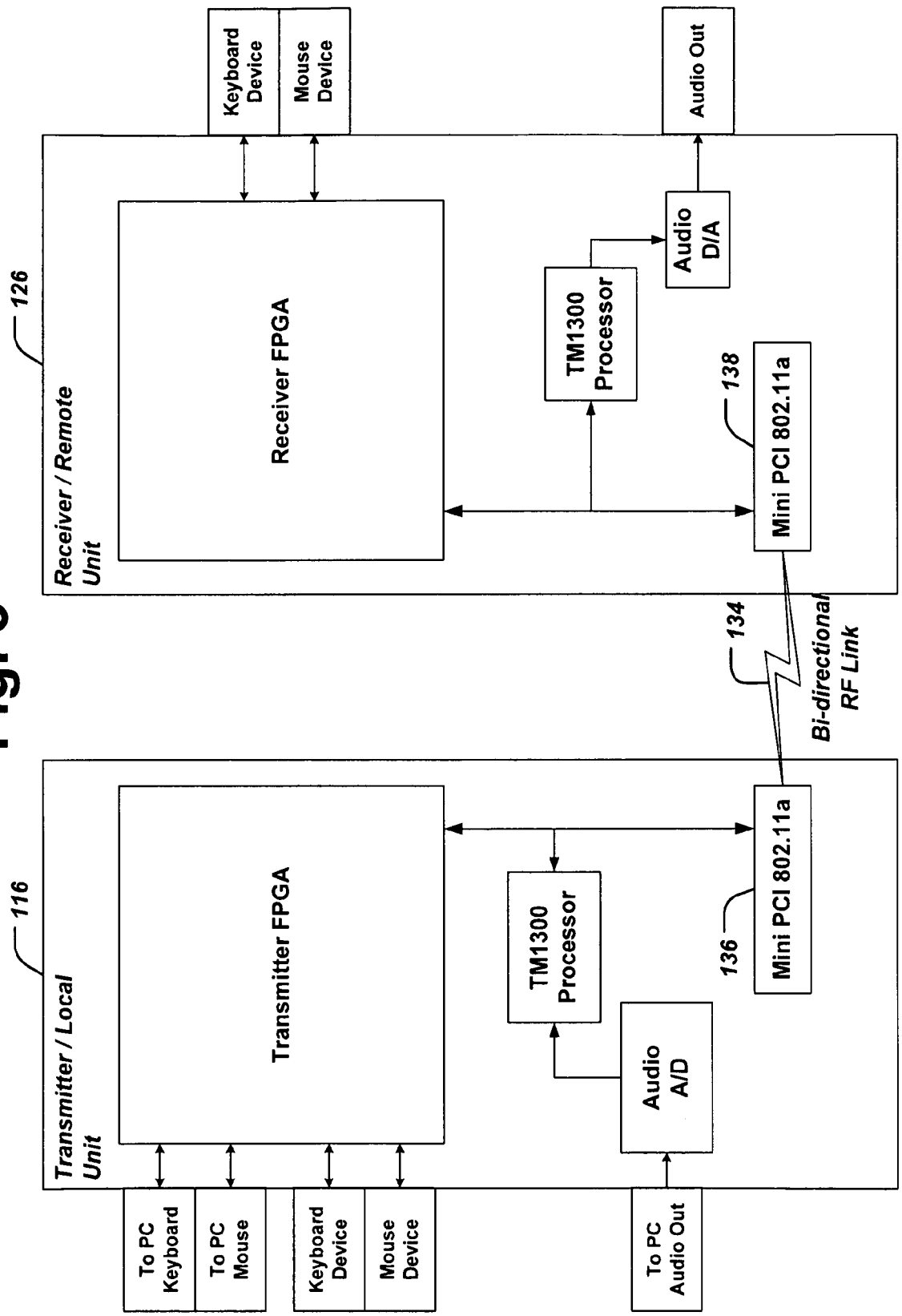
FIG. 3 depicts aspects of a keyboard, mouse, and audio system for local and remote units according to embodiments of the present invention.

FIG. 2 is a block diagram depicting aspects of a video system according to embodiments of the present invention, indicating transmitter (local) unit 116 and receiver (remote) unit 126. FIG. 3 is a block diagram showing aspects of a keyboard, mouse, and audio system according to embodiments of the present invention for the local and remote units 116, 126, respectively.

With reference to FIGS. 2 and 3, in operation, the system transmits video and possibly audio signals from an attached computer 102 from the transmitter (local) unit 116 to a receiver (remote) unit 126. In presently preferred embodiments, the units are in range of a 802.11a wireless radio link 134 between their respective wireless (Mini PCI 802.11a) cards 136 and 138. Those skilled in the art would understand that different types of wireless links will give different acceptable distance ranges. The system also communicates keyboard and mouse control information from the receiver/remote unit 126 back to the transmitter/local unit 116. Keyboard and mouse connections at the transmitter allow control of the computer 102 at the transmitter unit as well as the receiver unit. In addition there is a monitor port 117 on the transmitter to allow viewing of the video signal before transmission.

The transmitter/local unit 116 attaches to a target computer 102 via video and audio output connectors and keyboard and mouse input connectors. As indicated in FIG. 2, the transmitter 116 digitizes and compresses the analog video input to reduce radio bandwidth requirements. Details of the compression algorithms appear in co-pending application Ser. No. 10/947,191, titled "Compression System and Methods," filed concurrently herewith, the contents of which are incorporated herein by reference. In some embodiments, compression occurs pixel to pixel with a line-fitting algorithm generating video segments with length up to nine pixels. Compression may also occur between frames such that the transmitter unit 116 sends only the part of a line changed between frames, from the first pixel that is different to the end of the line. This strategy is referred to herein as the Left Margin algorithm (described in greater detail in co-pending application Ser. No. 10/947,191. A user at the receiver 126 adjusts video parameters either manually or automatically using an On Screen Display (OSD) in the receiver driven by the attached keyboard 106 and mouse 110 and observed on the receiver monitor 108.

In the case of point-to-point operation between a target system 114 and remote station 124, reliable transfer of data packets between the wireless cards 136, 138 is preferably realized using a handshake protocol embodied in the wireless card, e.g., an Atheros AN5002X chipset based system. In a current embodiment the application software layer uses a subroutine, hereinafter referred to as SendFrame, to supply the wireless card 136 (in the transmitter/local unit 116) with video data for transmission. In the SendFrame routine, the application layer sequentially reads all the segments of the current captured frame and packs them into a sequence of packets, submitting them to a packet queue to be transmitted as they are constructed. When the transmitting radio 136 receives a packet for delivery, it attempts to deliver the packet to the receiving radio 138. When the receiving radio 138 receives the data packet, it verifies that the packet is intact and contains no errors, and sends an acknowledgement packet back to the transmitting radio 136. When the original transmitting radio 136 receives the acknowledgement, it considers the transmission of the data packet to be complete and it deletes the packet from the queue. In the case that the receiving radio 138 detects an error in the packet received, it will not send an acknowledgement packet. If the transmitting radio 136 does not receive an acknowledgement packet within a pre-determined time period after transmission of the data packet is completed, the transmitting radio "times out" and assumes that the packet was lost or damaged. In this situation the transmitting radio 136 will send the packet to the receiving radio 138 again, waiting for the acknowledgement packet as confirmation of success. In one present embodiment the transmitting radio 136 is allowed to retry the packet transmission up to 29 consecutive times, after which the transmitting radio 136 gives up and deletes the packet from its queue. Typically, packet retransmission uses a system of progressively slower link rates to try and secure a stable transmission for the data packet. Other embodiments may allow a different number of attempts at packet retransmission.

In the case of point-to-multipoint operation (one target system 114 to many remote stations 124) the transmitting radio 136 cannot receive acknowledgement from all possible receiving radios 138 due to limitations in the Atheros-based radio design, which does not allow multiple acknowledgement packets for a single transmitted data packet. To deal with this issue, the set of remotes receiving the video includes one receiving radio 138 which is actively acknowledging received packets as in point-to-point mode described above. The remainder of the receiving radios 138 receive the data packets in a passive, non-acknowledging mode referred to a "promiscuous" mode. The remote unit 126 containing the radio receiver 138 responsible for sending out the acknowledgement packets is referred to herein as an "acker". The remote units 126 containing the radio receiver 138 that are functioning in promiscuous mode are referred to as "snoopers" or "snooping remotes". At issue is the fact that without the data packet resend process enjoyed by an acker, snoopers have no automatic mechanism to address lost or damaged packets. This results in an unacceptable degradation of video quality on the snoopers compared to the acking remote.

Figure 4:
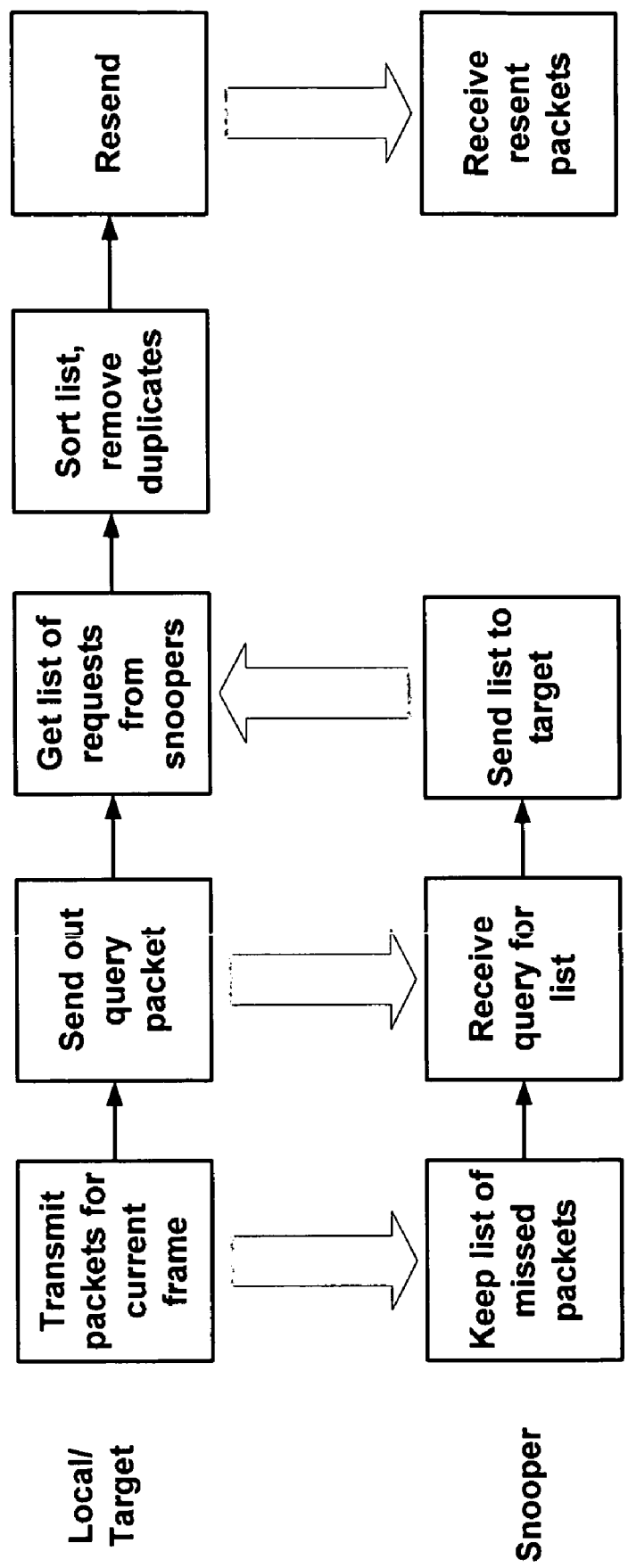
FIG. 4 is a flowchart of the operation of an aspect of the present invention.

To deal with the issue of lost or damaged packets received at a snooper, a higher level system was implemented to allow for a snooper to request packets to be resent by the target system 114. With reference to the flowchart in FIG. 4, snooping remotes keep a list of packets that are missed in the sequence of packets representing the present frame. The target system 114 transmits each packet with an incrementing packet offset in each frame beginning with index zero. After the target system 114 has sent all packets for the present frame, it sends out a query packet requesting snooping remotes to provide a list of the packets, by offset, that need to be resent. To simplify the resend-request data structure and control bandwidth requirements, the number of packets that can be requested from a given snooper is limited, e.g., to thirty two. The local receives all the requests, sorts the list into ascending order by offset and removes duplicate requests. (It is possible for two snoopers to request retransmission of the same lost packet creating a duplicate request.) The local then resends from the saved packet data the packets requested by number (offset). Only when this process completes does the local unit release (delete) the packets for the current frame and allow the local to capture another frame. Since the number of packets that can be requested is limited, when the number of missed packets exceeds the limit then there could be missed packets that are not requested. The request and resend process may fail over the radio link. This will result in one or more lines in the remote being flagged as "no-paste" lines, indicating that they cannot be processed in future frames unless a line is received starting with pixel zero. The Directed Refresh feature addresses this issue.

Directed Refresh

In addition to a continual sequential line refreshing operation, the remote unit sends a list of line numbers that are currently marked as "no-paste" lines in the remote unit 126. The remote unit 126 ignores additional information about these lines until an entire line is received beginning with the first pixel. Attempting to process partial lines after video data is lost will produce a corrupted image. The sequential refresh operation will in time force the sending of a full line of information on this line, but it may be several seconds before it happens to process the line that actually needs a refresh.

This process is accelerated by allowing the remote to send a list of line numbers needing refreshing, allowing remote units 126 to direct the fresh operation toward actual lines needing refreshing. The same procedure is followed as for the sequential refresh. The first segment of the affected line is modified to cause frame-to-frame comparison in the FPGA to fail using a procedure referred to as "frame-to-frame spoiling".

In the case of a broadcast architecture, the above procedure in the local unit is subject to process lines more than once in a given frame. Upon inspection of the frame-to-frame spoiling expression, this would tend to restore the pixel value in VO (Video Out) memory close to its original value. The broadcast architecture uses an array of bits to implement this. A bit in the array can be set to "1" by multiple remote units 126 with no ill effects. The array used to communicate the list of refresh lines from any given remote unit 126 is fixed in maximum size, so the remote fills the array with the first no-paste lines in the frame. Sending the frame clears the refresh bit array in the local unit.

In order to coordinate this process with the sequential refresh operation, requests for refresh lines from remote units are filled on a priority basis, up to the limit of the refresh value given by a variable/parameter. In the event that the total number of requests for refresh lines is less than the value of the variable, fill in up to the limit with lines from a sequential walk down the display. A static variable points to the next line to use in the sequential process. If there are no refresh requests from remote units 126 then the algorithm performs as before, working its way down the screen refreshing lines.

Directed refresh may dramatically reduce the length of time that visual artifacts remain on the screen. In theory directed refresh may make sequential refresh obsolete, but it may be left in place in order to guarantee that whatever happens, correct frame-to-frame operation always resumes in approximately two seconds. Removing the original washing refresh feature would result in a reduction in data rate.

Access and Switching

A primary purpose of the system according to the present invention is to provide access to one or more computers some distance away via wireless radio link. The system connects through wired (or wireless) means keyboard and mouse input devices and a video display output device at the local unit 116. The system connects through wireless means keyboard and mouse input devices and a video display device at the remote unit 126 located some distance away but in range of the wireless radio subsystem. A user at the remote station 124 uses the keyboard and mouse to command the received unit through the On Screen Display ("OSD", described below) to initiate a connection to a selected local unit 116 via wireless link. The use of the OSD in the receiver unit 126 in connection with control of the wireless link constitutes a switch.

Since any remote unit 126 can in general create a connection to any local unit 116, a plurality of local units 116 and remote units 126 within wireless range effectively form a cross point switch across the wireless medium (FIG. 1). The system architecture of the present invention supports all combinations of connections, specifically unicast, multicast or broadcast configuration. That is, one remote unit 126 can connect to one local unit 116, multiple remote units 126 can connect to any of several local units 116, or all remote unit 126 can connect to the same local unit 116. The system supports multiple connections using the same channel allowing several remote units 126 to connect to the same local unit 116 at the same time.

In order to connect multiple remote units 126 to one local unit 116, the local unit 116 CPU must appropriately merge the multiple keyboard and mouse control input streams. The keyboard and mouse section below describes mouse and keyboard data merging in some detail.

Radio Transport

In order for the system to operate better, the 802.11a radio link has been customized in a number of ways. Beacons were removed in conjunction with AES encryption to create a simpler ad hoc network architecture resulting in quieter radio operation and faster response with multiple radios in use.

The remote unit 126 controls connection and reconnection to the local unit 116.

In the event that the link to the local unit 116 temporarily fails, the remote unit 126 reserves the channel previously used in anticipation of restoring the connection. Either the propagation of radio waves could fail or the local unit 116 could lose power or is reset.

For some embodiments, the packet size was increased from 1K to 4K and the spacing between packets was reduced, thus improving system throughput.

On Screen Display

The On Screen Display (OSD) provides a user interface to the system from the remote unit 126. Included in this interface is the ability to change video parameters in the local unit 116 via the wireless link. OSD commands permit the user at the remote unit 126 to modify brightness, contrast, and clock phase associated with the A/D process in the local unit 116. These commands set parameters in the A/D circuit from the CPU via the I²C bus. The user may also change both horizontal and vertical screen position. These commands alter registers in the FPGA that determine start and end points for lines and frames.

Additionally, the OSD provides the user with the ability to turn audio on and off, turn compression on and off, change the frame-to-frame threshold and enable password protection. Turning audio off halts audio transport over the wireless link but continues to receive audio into the local CPU. Turning compression off commands the compressor in the FPGA to produce only absolute segment codes. Setting the frame-to-frame threshold modifies a transmitter FPGA register.

The OSD typically allows the user to select a local unit 116 to connect to by allowing the user to select a local unit 116 from a list of available local unit 116 MAC IDs. Once the remote unit 126 is connected to a local unit 116, the OSD provides the user the ability to rename the local unit 116 unit so that it can be identified by an alphanumeric name instead of its MAC ID. The local unit 116 then stores this alphanumeric name and uses this identity thereafter for all receivers.

Keyboard and Mouse

Firewall

Fundamental to the concept of a wireless KVM is a transparent keyboard and mouse interface. To accomplish this, the local unit 116 must respond like a mouse and keyboard to the computer regardless of whether there is a mouse and keyboard connected or whether it is connected to a remote unit 126. The system accomplishes this by firewalling the interface to the computer mouse and keyboard inputs. The firewall implemented in the current system boots the computer so that it reacts as though connected to a standard two button mouse. Thus any mouse device connected to the current system will only have the functionality of a standard two button mouse. The local unit 116 CPU stores device configuration parameters received from the computer such as mouse resolution, scaling, and data rate. The local unit 116 CPU then passes configuration parameters on to the device-side firewall as described below. These parameters are also passed on to the remote unit 126 device-side firewall at connection time.

In addition to firewalling the computer, the system also firewalls the mouse and keyboard interfaces in both the local unit 116 and remote unit 126. The CPU passes normal data from the device to the host computer, but the CPU responds to computer and boot sequences independently at different times. The CPU in both the local unit 116 and remote unit 126 provides a proper boot response to attached mouse and keyboard devices using the configuration parameters gathered from the computer during boot. In the current system, mice are booted up as standard two button mice.

These firewalls allow a user full so-called "hot plugging" ability on both the local unit 116 and remote unit 126. With the local unit 116 unit turned on and connected, the host computer can be booted up with or without a mouse or keyboard attached. A mouse or keyboard can be plugged in to or unplugged from the local unit 116 or remote unit 126 at any time without corrupting the mouse or keyboard interface in the computer.

Typical Boot Sequence

The functionality of the firewall can be demonstrated by looking at a typical usage scenario. The local unit 116 is turned on and plugged into the host computer with no keyboard or mouse attached to the local unit 116. The host computer 102 is turned on and boots up normally. During the computer boot sequence, the computer 102 queries the PS2 lines to determine what devices are attached. The computer interface firewall intercepts the commands from the host and responds that a standard keyboard and a standard two button mouse are connected. The computer then issues commands to configure the devices. The firewall also intercepts these commands and the computer saves configuration information.

Sometime later a keyboard and mouse are connected to the local unit 116. The device-side firewall intercepts the power-on self-test-passed commands from the devices and initializes the devices with the configuration data saved from the computer boot sequence. After initialization, the CPU passes data from the device to the host computer 102. If the device is unplugged and reattached, the device-side firewall intercepts the power-on self-test-passed command(s) and reinitializes the device(s).

Next a remote unit 126 is turned on with a keyboard and mouse connected. At power up, the device side firewall in the remote unit 126 initializes the devices with a default configuration. The user operates the OSD to connect to the local unit 116 from the previous paragraph. At the time the connection is made, the local unit 116 sends the device configuration information over the wireless link to the remote unit 126. When the remote unit 126 receives the configuration information, it resets the mouse device and reinitializes it with the new configuration data. The keyboard is also reconfigured with the new configuration data. The mouse and keyboard now function as though connected directly to the computer, except that they may be unplugged and reattached at any time. The device side firewall then acts as previously described above.

Merging Multiple Data Sources

These firewalls allow the use of multiple mouse and keyboard data sources to be merged into one consistent mouse and keyboard interface. In the local unit 116 software, data from the attached mouse and keyboard is passed on to the host computer 102 via mouse and keyboard data buffers. The CPU places mouse and keyboard data arriving over the wireless link in the buffers as data arrives. A single packet of mouse data is composed of multiple bytes of data. Thus the CPU collects a complete packet before presenting it to the computer 102. This prevents packet fragmentation or loss when transmitting over the wireless link and also prevents interlacing the data from the mouse at the local unit 116 with the data from the mouse at one or more remote units 126.

This method of merging mouse and keyboard data allows the users to actively contend for control of the host computer. The assumption is that in a one local unit 116 to one remote unit 126 system, the users can arbitrate the use of the system amongst themselves.

A method of system control arbitration uses a timeout. The system keeps track of who is actively using the system based on the amount of time that has elapsed since the last control input (mouse and keyboard). While that user is still active, other control inputs are locked out from the other sources. Once the user has been inactive for a certain period of time, the channel becomes open for use by someone else.

System Integration

In some embodiments, the remote unit 126 can be integrated with a base station for a wireless keyboard and mouse. A flat panel display can then incorporate the remote unit 126 inside the back of the display. The only external wiring required is power for the unit. The battery-powered mouse and keyboard devices communicate over a wireless link to the base station in the remote unit 126, which in turn communicate over a different wireless link to the local unit 116. This unique approach can also be applied to plasma TVs to allow wireless computer usage from across the room.

Connecting to a computer 102 some distance away via a wireless switch not only allows multiple access terminals to the same computer, but also gives a parent or IT personnel the ability to monitor computer usage. The wireless switch gives the parent or IT personnel WYSIWIS (What-You-See-Is-What-I-See) capability. Simultaneous control also permits a shared-whiteboard conferencing concept.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed:

1. In a keyboard-video-mouse ("KVM") system in which a target computer may be wirelessly accessed by a plurality of remote stations, a method comprising, by the target computer:
    (A) obtaining a frame of video data;
    (B) transmitting packets for the frame;
    (C) transmitting a query packet requesting at least some of said plurality of remote stations to provide a list of packets that need to be resent;
    (D) obtaining from each of at least two of the remote stations, a list of one or more packets that need to be resent, wherein the list of packets from a particular remote station identifies packets missed by that particular remote station;
    (E) removing duplicates from the lists of packets that need to be resent; and then
    (F) resending at least some of the requested packets.

2. A method as in claim 1 further comprising:
    repeating (A) through (B) while there is more video data.

3. A method as in claim 1 further comprising:
    sorting the lists of packets that need to be resent prior to removing duplicates.

4. In a keyboard-video-mouse ("KVM") system in which a target computer may be wirelessly accessed by a plurality of remote stations, a method comprising, by the target computer:
    (A) obtaining a frame of video data;
    (B) transmitting packets for the frame;
    (C) transmitting a query packet requesting at least some of said plurality of remote stations to provide a list of packets that need to be resent;
    (D) obtaining from each of at least two of the remote stations, a list of one or more packets that need to be resent, wherein the list of packets from a particular remote station identifies packets missed by that particular remote station;
    (E) sorting received lists of packets and removing duplicates from the lists of packets that need to be resent;
    (F) resending at least some of the requested packets; and
    repeating (A) through (F) while there is more video data.

5. A device, in a keyboard-video-mouse ("KVM") system in which a target computer may be wirelessly accessed by a plurality of remote stations, the device comprising:
    (A) a mechanism constructed and adapted to obtain a frame of video data;
    (B) a mechanism constructed and adapted to transmit packets for the frame;
    (C) a mechanism constructed and adapted to transmit a query packet, said query packet requesting at least some of said plurality of remote stations to provide a list of packets that need to be resent;
    (D) a mechanism constructed and adapted to obtain from each of at least two of the remote stations, a list of one or more packets that need to be resent, wherein the list of packets from a particular remote station identifies packets missed by that particular remote station;
    (E) a mechanism constructed and adapted to remove duplicates from the lists of packets that need to be resent; and
    (F) a mechanism constructed and adapted to resend at least some of the requested packets.

6. A method as in claim 5 further comprising:
    a mechanism constructed and adapted to sort the lists of packets that need to be resent prior to removing duplicates.

* * * * *